Dec. 8, 1970     M. D. POLAND     3,545,028
WINDSHIELD WIPER REPLACEMENT BLADE
Filed Dec. 4, 1968
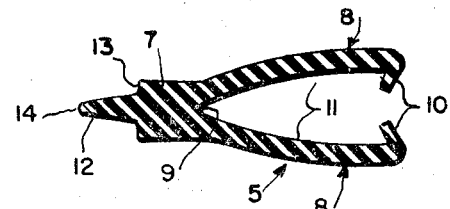
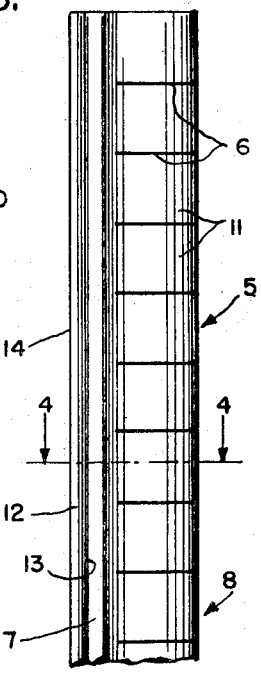
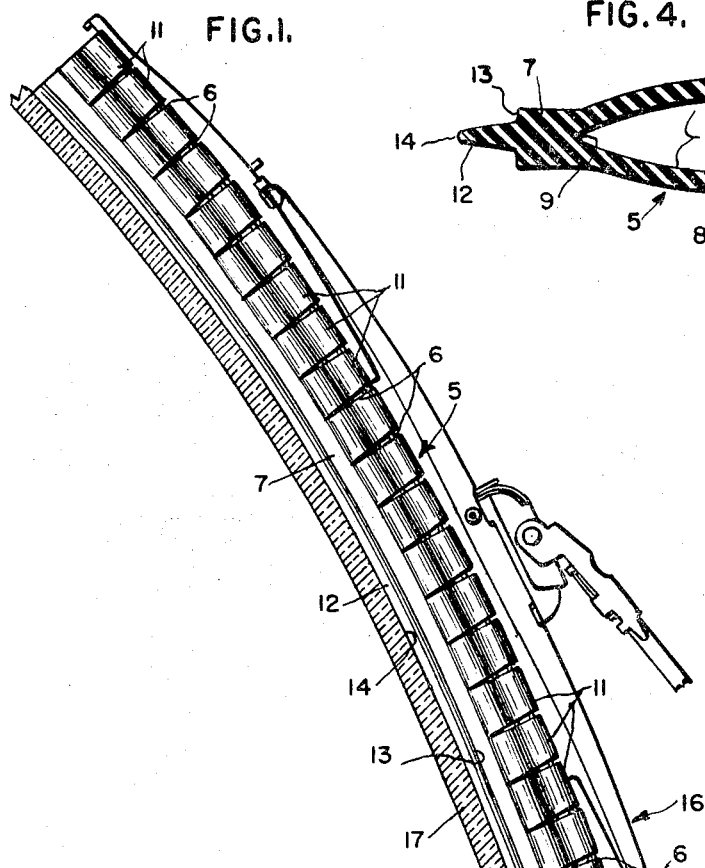
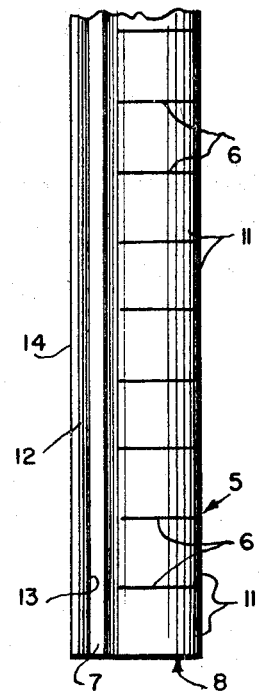
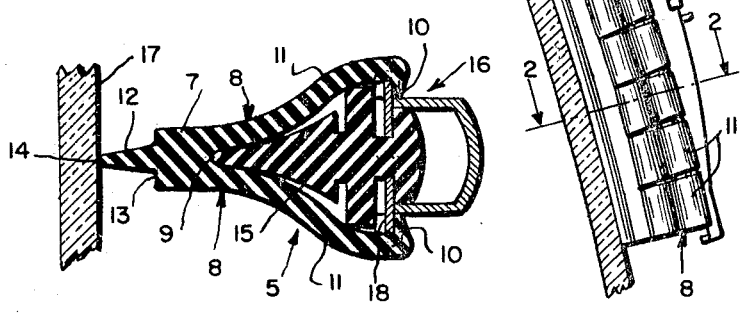
INVENTOR
MAURICE D. POLAND
BY *John N. Randolph*
ATTORNEY

United States Patent Office 3,545,028
Patented Dec. 8, 1970

3,545,028
WINDSHIELD WIPER REPLACEMENT BLADE
Maurice D. Poland, 2272 NW. 90th St.,
Miami, Fla. 33147
Filed Dec. 4, 1968, Ser. No. 781,206
Int. Cl. B60s 1/38
U.S. Cl. 15—250.36     3 Claims

ABSTRACT OF THE DISCLOSURE

A replacement windshield wiper blate constituting a unitary structure capable of being applied over a worn-out wiper blade and attached to and supported by a part of the wiper blade assembly. The replacement blade is capable of flexing readily with the original wiper blade and the wiper blade assembly to conform to the curved contour of the vehicle windshield.

SUMMARY

It is a primary object of the present invention to provide an inexpensive windshiled wiper replacement blade which is capable of being applied over a worn-out wiper blade and attached to and supported by a part of the wiper blade assembly to eliminate the necessity of completely replacing the worn-out blade and the blade assembly.

Another object of the invention is to provide a replacement blade constituting a unitary structure which is capable of flexing with the blade assembly to which it is attached to conform to and follow the varying curvature of modern motor vehicle windshields.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a fragmentary side elevational view showing the replacement blade applied to a conventional windshield wiper assembly and in an operative position in contact with a part of a vehicle windshield, shown in section;

FIG. 2 is an enlarged cross sectional view taken substantially along a plane as indicated by the line 2—2 of FIG. 1;

FIG. 3 is a fragmentary side elevational view of the replacement blade before attachment to the windshield wiper assembly, and on a somewhat enlarged scale relative to FIG. 1, and FIG. 4 is a cross sectional view thereof taken substantially along a plane as indicated by the line 4—4 of FIG. 3.

DESCRIPTION OF THE PREFERRED EMBODIMENT

Referring more specifically to the drawing, the windshield wiper replacement blade in its entirety and comprising the invention is designated generally 5 and comprises an elongated body member of generally V-shaped cross section, as seen in FIG. 4, including a solid base portion 7 and corresponding walls 8 which are formed integral with the base portion 7 and which extend from a backside 9 thereof in diverging relation to one another. The walls 8 at their outer edges are provided with corresponding inturned flanges 10 which are inclined inwardly with respect to said walls.

The walls 8 are slit transversely from their outer edges to or substantially to the base 7 with the slits 6 of the two walls disposed in transverse alignment with one another to divide each of the walls 8 into a plurality of clips 11, with said clips of the two walls being disposed in opposed relation to one another and with the portions of the flanges 10 of the clips forming hooks for a purpose which will hereinafter be described.

The rpelacement blade additionally includes a wiping edge 12 which is formed integral with and extends from the other front side 13 of the base 7. The wiping edge 12 is of a thickness substantially less than the thickness of the base 7 and tapers away from said base, so that the edge portion 14 thereof, which is adapted to contact the windshield, is of a thickness substantially less than the part thereof which merges with the base 7.

The replacement blade 5, as clearly illustrated in the drawing, is of one piece construction and is formed of rubber; however, the base portion 7 and clips 11, including the hooks 10, are of a hardness substantially greater than that of the wiping edge 12 which is of a hardness corresponding substantially to that of a conventional windshield wiper blade.

The unit constituting the wiper blade 5 may be made in any length and cut off to a length corresponding to the length of a worn-out windshield wiper blade 15, as seen in FIG. 2, and to which replacement blade 5 is to be applied. The windshield wiper blade 15 and the wiper blade assembly 16, of which it forms a part, is of conventional construction and of the type including parts which are capable of flexing readily so that the blade 15 can follow the varying curvature of a vehicle windshield 17 and remain in contact therewith throughout the length of the blade. The conventional blade assembly 16 includes a flexible metal strip 18 which extends from end-to-end of the blade 15 and by which the blade is supported, as seen in FIG. 2.

To apply replacement blade 5 to the blade assembly 16, the blade assembly 16 is displaced sufficiently away from the windshield 17 so that the replacement blade 5 can be positioned between the windshield and the worn-out blade 15 with the wiping edge portion 14 against the windshield. The edge of the worn-out blade 15 is then forced between the opposed hooks 10 for spreading the opposed clips 11 from end-to-end of the blade 5, and the blade 15 is forced into the space between the clips 11 until its wiping edge contacts or substantially contacts the side 9 of the base 7 at which time the hooks 10 will have passed outwardly across the flexible strip 18, so that said hooks can spring inwardly against the outer side of the side edge portions of the strip 18 to complete the attachment of the replacement blade 5 to the blade assembly 16.

When the blade assembly 16 is released to spring back toward the windshield 17, the clips 11 of each wall 8 will be separated, as seen in FIG. 1, due to the fact that the slits 6 will assume open positions and form slots which taper toward the base 7, to enable the replacement blade 5 to flex longitudinally to conform to the contour of the portion of the windshield 17 engaged by the edge portion 14. Without the slits 6 which are capable of opening to form the tapered slots of FIG. 1, the walls 8 in view of their width and hardness would prevent the replacement blade 5 from flexing longitudinally from its straight position of FIG. 3 to its bowed position of FIG. 1. However, the solid base 7 is sufficiently narrow so that it can flex readily.

From the foregoing, it will be apparent that a replacement wiper blade of extremely simple construction has been provided which may be very economically manufactured and quickly and easily applied over a worn-out wiper blade and attach to the wiper blade assembly and which requires no separate attaching means for retaining the blade applied to the wiper assembly.

I claim as my invention:
1. A replacement blade for a windshield wiper assembly comprising an elongated rubber body member of

V-shaped cross section including a base portion and two walls extending outwardly from one side of the base portion, a wiping edge extending from the opposite side of said base portion, said walls having flanges at their outer edges extending inwardly of one another, said walls each being transversely slit to provide a plurality of clips, the clips of the two walls being disposed in opposed relation to one another and the flange portions of said clips forming hooks adapted to engage over a flexible metal strip of a windshield wiper assembly when a worn-out wiper blade of the assembly is disposed between the clips formed by the two walls for detachably mounting the replacement blade on the wiper assembly.

2. A replacement windshield wiper blade as in claim 1, said replacement blade being formed of rubber, and said wiping edge being substantially softer than said base portion and clips.

3. A replacement wiper blade as in claim 1, said replacement blade being formed of rubber, said base portion and wiping edge being sufficiently flexible to bow longitudinally, and said slits permitting the clips of each wall to spread relative to one another to enable the replacement wiper blade to bow longitudinally in a direction such that the wiping edge thereof is concave to flex with the windshield wiper assembly to conform to the varying convex curvature of portions of a vehicle windshield over which said wiping edge is moving.

References Cited

UNITED STATES PATENTS

| | | | |
|---|---|---|---|
| 2,700,785 | 2/1955 | Oishei et al. | 15—250.4X |
| 2,792,585 | 5/1957 | Scinta | 15—250.36UX |
| 2,926,375 | 3/1960 | Flynn | 15—250.36 |

ROBERT W. MICHELL, Primary Examiner